US011683082B2

(12) United States Patent
Turtinen et al.

(10) Patent No.: US 11,683,082 B2
(45) Date of Patent: Jun. 20, 2023

(54) BEAM FAILURE DETECTION WITH DIFFERENT INDICATION INTERVALS

(71) Applicant: Nokia Technologies Oy, Espoo (FI)

(72) Inventors: Samuli Heikki Turtinen, Ii (FI); Timo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/962,544

(22) PCT Filed: Nov. 9, 2018

(86) PCT No.: PCT/EP2018/080811
§ 371 (c)(1),
(2) Date: Jul. 16, 2020

(87) PCT Pub. No.: WO2019/141398
PCT Pub. Date: Jul. 25, 2019

(65) Prior Publication Data
US 2020/0413273 A1 Dec. 31, 2020

(30) Foreign Application Priority Data
Nov. 9, 2018 (WO) .................. PCT/EP2018/051416

(51) Int. Cl.
*H04W 76/19* (2018.01)
*H04B 7/06* (2006.01)
(Continued)

(52) U.S. Cl.
CPC ........... *H04B 7/0695* (2013.01); *H04B 7/088* (2013.01); *H04W 24/08* (2013.01); *H04W 76/18* (2018.02); *H04W 76/19* (2018.02); *H04W 76/28* (2018.02)

(58) Field of Classification Search
CPC .... H04B 7/0695; H04B 7/088; H04B 7/0408; H04W 24/08; H04W 76/18; H04W 76/19; H04W 76/28; H04L 5/005
See application file for complete search history.

(56) References Cited

U.S. PATENT DOCUMENTS 9,660,743 B1 * 5/2017 Ashkenazi ............... H04B 1/69
10,979,128 B1 * 4/2021 Babaei ................. H04B 7/0695
(Continued)

FOREIGN PATENT DOCUMENTS

| EP | 2341741 A1 | 7/2011 |
|---|---|---|
| JP | 2000-155168 A | 6/2000 |
| WO | 2019/141379 A1 | 7/2019 |

OTHER PUBLICATIONS

3GPP TS 38.133 v15.0.0 (Year: 2017).*
(Continued)

*Primary Examiner* — Hassan Kizou
*Assistant Examiner* — Hector Reyes
(74) *Attorney, Agent, or Firm* — Squire Patton Boggs (US) LLP

(57) ABSTRACT

There are provided measures for enabling/realizing enabling/realizing beam failure detection with different indication intervals, e.g. beam failure detection in a higher layer such as a MAC entity of a user equipment element or base station element. Such measures exemplarily comprise that a beam failure detection procedure is performed on the basis of beam failure instance indications from a lower layer using a beam failure detection timer, and application of the beam failure detection timer in the beam failure detection procedure is controlled in view of indication intervals which are applicable for the beam failure instance indications from the lower layer in the beam failure detection procedure.

20 Claims, 9 Drawing Sheets

(51) Int. Cl.
*H04W 76/18* (2018.01)
*H04W 76/28* (2018.01)
*H04B 7/08* (2006.01)
*H04W 24/08* (2009.01)

(56) References Cited

U.S. PATENT DOCUMENTS

| | | | | |
|---|---|---|---|---|
| 11,026,109 | B2* | 6/2021 | Wei | H04W 76/19 |
| 2011/0183663 | A1 | 7/2011 | Kenehan et al. | |
| 2016/0353510 | A1 | 12/2016 | Zhang et al. | |
| 2017/0373731 | A1 | 12/2017 | Guo et al. | |
| 2018/0006770 | A1 | 1/2018 | Guo et al. | |
| 2019/0200248 | A1* | 6/2019 | Basu Mallick | H04B 7/088 |
| 2019/0208436 | A1* | 7/2019 | Zhou | H04L 1/0026 |
| 2020/0389847 | A1* | 12/2020 | Deng | H04W 76/28 |
| 2021/0058134 | A1* | 2/2021 | Luo | H04W 16/28 |

OTHER PUBLICATIONS

Office action received for corresponding Indian Patent Application No. 202047035566, dated May 7, 2021, 7 pages of office action.
Office action received for corresponding European Patent Application No. 18796690.8, dated Jul. 27, 2021, 6 pages.
"3rd Generation Partnership Project; Technical Specification Group Radio Access Network; NR; Medium Access Control (MAC) protocol specification (Release 15)", 3GPP TS 38.321, V15.3.0, Sep. 2018, pp. 1-76.
"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.
"3rd Generation Partnership Project; Technical Specification Group Radio Access Network; NR; Physical layer procedures for control (Release 15)", 3GPP TS 38.213, V15.3.0, Sep. 2018, pp. 1-101.
"3rd Generation Partnership Project; Technical Specification Group Radio Access Network; NR; Requirements for support of radio resource management (Release 15)", 3GPP TS 38.133, V15.3.0, Sep. 2018, pp. 1-136.
International Search Report and Written Opinion received for corresponding Patent Cooperation Treaty Application No. PCT/EP2018/080811, dated Jan. 24, 2019, 23 pages.
"RA Procedure and Parameters for BFR", 3GPP TSG-RAN WG2 NR Ad hoc 0118, R2-1800254, Agenda: 10.3.1.4.2, CATT, Jan. 22-26, 2018, pp. 1-5.
"Correction to BFD Procedure in DRX Mode", 3GPP TSG-RAN WG2 #AH NR 1802, R2-1810425, Qualcomm, Jul. 2-6, 2018, 3 pages.
Korean Office Action issued in corresponding Korean Patent Application No. 10-2020-7024003 dated Feb. 16, 2022.
Nokia, Nokia Shanghai Bell, "Clarifications to Beam Recovery Procedure", 3GPP TSG-RAN WG2 NR Ad hoc 1801, Vancouver, Canada, Jan. 22-26, 2018, R2-1800963, 8 pages.
Chinese Office Action corresponding to CN Application No. 201880087456.2, dated Jan. 18, 2023.
Korean Office Action corresponding to KR Application No. 10-2020-70240003, dated Aug. 9, 2022.
European Communication pursuant to Article 94(3) EPC, corresponding to EP Application No. 18 796 690.8, dated Mar. 31, 2023.

* cited by examiner

BEAM FAILURE DETECTION WITH DIFFERENT INDICATION INTERVALS

RELATED APPLICATION

This application claims priority to PCT Application No. PCT/EP2018/080811, filed on Nov. 9, 2018, which claims priority to PCT Application No. PCT/EP2018/051416, filed on Jan. 22, 2018, each of which is incorporated herein by reference in its entirety.

FIELD

The present disclosure relates to beam failure detection with different indication intervals. More specifically, the present invention relates to measures (including methods, apparatuses and computer program products) for enabling/realizing beam failure detection with different indication intervals, e.g. beam failure detection in a higher layer such as a MAC entity of a user equipment element or base station element.

BACKGROUND

The present disclosure relates to detecting a beam failure event by a beam failure detection procedure on a higher layer such as e.g. the MAC layer based on indications of beam failure instances provided by a lower layer such as e.g. the PHY/L1 layer which leads to triggering of a beam failure recovery request procedure. Hereinafter, MAC and PHY/L1 are used as illustrative examples for applicable layers or entities to explain the present disclosure, yet without being restricted thereto.

In cellular communication systems, radio link management (RLM) and radio resource control (RRC) generally play an important role for managing/controlling the radio link between a user equipment element and a base station element. Such radio link is realized by one or more serving beams from the base station element towards the user equipment element, and a radio link failure (RLF) occurs when there is no (sufficiently good) serving beam for carrying a control channel with appropriate quality. Accordingly, a beam failure can be regarded as a case of a radio link failure or an event in which the serving beam fails or all serving beams fail (in the meaning that no link or, at least, no sufficiently good link quality can be provided thereby). Similarly, beam failure recovery can be regarded as a case of a radio link recovery.

Under 3GPP 5G/NR standardization, beam management between gNB and UE is addressed, supporting beam management procedures on the basis of SSB/CSI-RS measurements. This encompasses, for example, beam failure detection and recovery procedures as well as candidate beam detection procedures.

In terms of beam failure detection, it is agreed that beam failure detection shall be determined based on the hypothetical PDCCH BLER as the relevant quality measure, which can be evaluated on the physical layer (PHY) or radio layer 1 (L1), namely by a UE's PHY/L1 entity. If the hypothetical PDCCH BLER is above a predefined threshold of e.g. 10% (beam failure instance condition), it is counted as a beam failure instance on the PHY/L1 layer. Deriving the hypothetical BLER may for example be based on the SS block/CSI-RS signals, wherein the SS block comprises PSS, SSS (Primary, Secondary Synchronization Signals), PBCH (including PBCH DMRS) signals.

Further, it is agreed that beam failure detection shall be implemented on a higher layer, specifically the medium access control (MAC) layer, namely by a UE's MAC entity. To this end, the UE's PHY/L1 layer or PHY/L1 entity shall provide a beam failure instance indication to the UE's MAC layer or MAC entity whenever the aforementioned beam failure instance condition on the lower layer is satisfied (namely, in slots where the radio link quality is assessed, the radio link quality for all corresponding resource configurations that the UE uses to assess the radio link quality is worse than the threshold). If the number of detected beam failure instances on the PHY/L1 layer, i.e. the number of beam failure instance indications on the MAC layer, reaches a beam failure instance threshold (which is configured by RRC), beam failure is detected and beam failure recovery is initiated on the MAC layer.

Beam failure detection/recovery on the MAC layer (of a UE) can thus be executed in that a beam failure instance counter (BFI counter), which is initially set (initialized) e.g. to 0, is incremented whenever a beam failure instance indication is received from the PHY/L1 layer and beam failure is detected when the beam failure instance counter (BFI counter) reaches the beam failure instance threshold (i.e. the beam failure instance maximum count value). Then, a beam failure recovery timer is started and a beam failure recovery request is sent to the serving gNB to indicate a new candidate beam, if a new candidate beam is detected.

Still further, it is agreed that a beam failure detection timer is re-/started whenever a beam failure instance indication is received from the PHY/L1 layer. In case there is no such beam failure instance indication while the beam failure detection timer is running, the beam failure detection timer expires, and the beam failure instance counter (BFI counter) is reset upon expiry of the beam failure detection timer such that the beam failure detection procedure starts over. Incidentally, the beam failure instance counter (BFI counter) is reset upon reconfiguration any one of the beam failure detection timer, the beam failure instance threshold or any reference signal/s used for beam failure detection (when reconfiguration is done explicitly, e.g. by an upper layer).

For the duration of the beam failure detection timer, it is agreed that the timer value of the beam failure detection timer is defined as an integer multiple of the indication interval for the beam failure instance indications, i.e. the reporting period (or periodicity) may be determined based on the reporting period (or periodicity) of the reference signal or signals used for beam failure detection, from the PHY/L1 layer to the MAC layer.

In this regard, it is to be noted that the indication interval for the beam failure instance indications, i.e. the reporting period (or periodicity) of the reference signal or signals used for beam failure detection, from the PHY/L1 layer to the MAC layer, can dynamically change even during the beam failure detection procedure, due to various reasons or conditions.

On the one hand, the reporting period (or periodicity) of the reference signal or signals used for beam failure detection may change when the active DL BWP and the relevant reference signal or signals for beam failure detection change or the active TCI state for PDCCH reception for a CORE-SET (control resource set) changes. The UE may be configured with multiple CORESETs, each associated with an active TCI state for PDCCH. Reporting period may also change when a periodicity of a reference signal changes. In more general terms, the reporting period may change when a (at least one) reference signal used for beam failure detection changes or a (at least one) signal property (e.g.

periodicity) of a (at least one) reference signal used for beam failure detection changes due to various reasons such as described herein but not limited to these reasons.

On the other hand, the reporting period (or periodicity) of the reference signal or signals used for beam failure detection may change in view of DRX settings or configurations. It is currently agreed that a specific reporting period (or periodicity) is applicable when the UE is not configured with DRX, i.e. when the discontinuous reception (DRX) is not applicable for/in the UE, while various specific reporting periods (or periodicities) are selectively applicable when the UE is configured with DRX, i.e. when the discontinuous reception (DRX) is applicable for/in the UE.

Herein, discontinuous reception (DRX) shall refer to a state in which (according to some negotiation or configuration) no receiving communication occurs at a network element, such as a UE, i.e. a state in which the network element turns a receiver off (and potentially also enters a low power state) or is not required to monitor PDCCH continuously but only in cycles.

For example, the currently agreed UE minimum requirements for beam failure instance indications from the PHY/L1 layer to the MAC layer change depending on whether DRX is in use or not. Therefore, the resulting beam failure detection procedure, with the beam failure detection timer being set according to the varying reporting periods (or periodicities), may not be optimal.

If the UE applies the timer value from the reporting period which is defined when DRX is not in use, the timer can easily expire when the DRX is actually used. This is because as the PHY/L1 instance indication interval may be much longer than the current value assumed for the beam failure detection timer, which may lead to a situation where the beam failure detection would never trigger during DRX. Otherwise, if the UE applies the timer value from the reporting period which is defined when DRX is in use, the timer may not expire when the DRX is actually not used, even when multiple reporting periods are without PHY/L1 instance indications. This may lead to a situation where an excessive number or frequency of beam failure detection events are unnecessarily detected.

Thus, there is a problem in that the beam failure detection procedure could not work properly in view of the fact that the indication interval for the beam failure instance indications, i.e. the reporting period (or periodicity) of the reference signal or signals used for beam failure detection, from the PHY/L1 layer to the MAC layer, can dynamically change even during the beam failure detection procedure, due to various reasons or conditions. Stated in other words, there is a problem of appropriately applying the beam failure detection timer in the beam failure detection procedure in view of varying or even dynamically changing PHY/L1 instance indication intervals.

Accordingly, there is room for improvement in enabling/realizing beam failure detection with different indication intervals, e.g. beam failure detection in a higher layer such as a MAC entity of a user equipment element or base station element.

SUMMARY

Various exemplifying embodiments of the present invention aim at addressing at least part of the above issues and/or problems and drawbacks.

Various aspects of exemplifying embodiments of the present invention are set out in the appended claims.

According to an example aspect of the present invention, there is provided a method comprising performing a beam failure detection procedure on the basis of beam failure instance indications from a lower layer using a beam failure detection timer, and controlling application of the beam failure detection timer in the beam failure detection procedure in view of indication intervals which are applicable for the beam failure instance indications from the lower layer in the beam failure detection procedure.

According to an example aspect of the present invention, there is provided an apparatus comprising at least one processor and at least one memory including a computer program code, wherein the at least one memory and the computer program code are configured, with the at least one processor, to cause the apparatus to perform at least the following: performing a beam failure detection procedure on the basis of beam failure instance indications from a lower layer using a beam failure detection timer, and controlling application of the beam failure detection timer in the beam failure detection procedure in view of indication intervals which are applicable for the beam failure instance indications from the lower layer in the beam failure detection procedure.

According to an example aspect of the present invention, there is provided an apparatus comprising means for performing a beam failure detection procedure on the basis of beam failure instance indications from a lower layer using a beam failure detection timer, and means for controlling application of the beam failure detection timer in the beam failure detection procedure in view of indication intervals which are applicable for the beam failure instance indications from the lower layer in the beam failure detection procedure.

According to an example aspect of the present invention, there is provided a computer program product comprising (computer-executable) computer program code which, when the program code is executed (or run) on a computer or the program is run on a computer (e.g. a computer of an apparatus according to any one of the aforementioned apparatus-related example aspects of the present invention), is configured to cause the computer to carry out the method according to the aforementioned method-related example aspect of the present invention.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present invention are set out in the following.

By way of exemplifying embodiments of the present invention, beam failure detection with different indication intervals, e.g. beam failure detection in a higher layer such as a MAC entity of a user equipment element or base station element, can be enabled/realized in an effective/improved manner.

BRIEF DESCRIPTION OF THE DRAWINGS

In the following, the present invention will be described in greater detail by way of non-limiting examples with reference to the accompanying drawings, in which.

DETAILED DESCRIPTION

Figure 1:
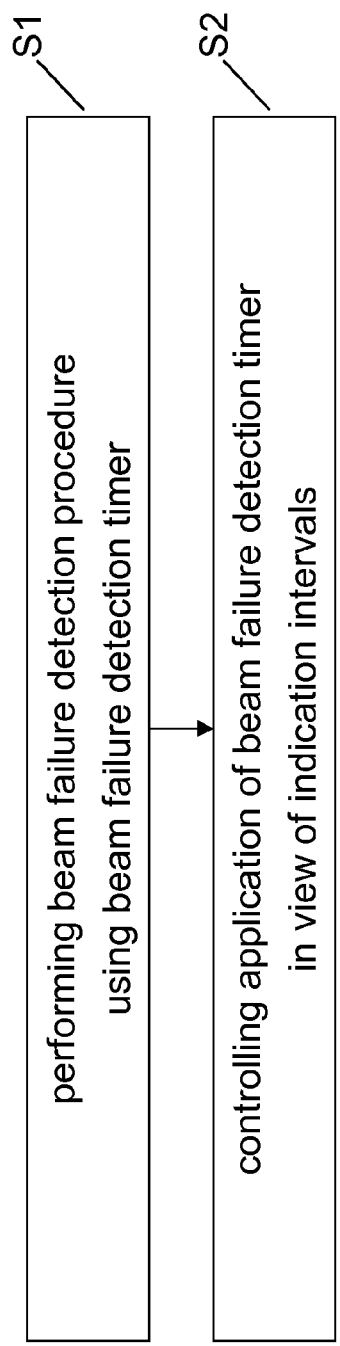
FIG. 1 shows a flowchart illustrating an example of a method of beam failure detection, operable at a network element of a cellular radio access network, according to exemplifying embodiments of the present invention.

The present disclosure is described herein with reference to particular non-limiting examples and to what are presently considered to be conceivable embodiments of the present invention. A person skilled in the art will appreciate that the present invention is by no means limited to these examples and embodiments, and may be more broadly applied.

It is to be noted that the following description of the present invention and its embodiments mainly refers to specifications being used as non-limiting examples for certain exemplifying network configurations and system deployments. Namely, the present invention and its embodiments are mainly described in relation to 3GPP specifications, specially referring to 5G/NR standardization (e.g. Release-15 onwards), being used as non-limiting examples. As such, the description of exemplifying embodiments given herein specifically refers to terminology which is directly related thereto. Such terminology is only used in the context of the presented non-limiting examples and embodiments, and does naturally not limit the invention in any way. Rather, any other system configuration or deployment may equally be utilized as long as complying with what is described herein and/or exemplifying embodiments described herein are applicable to it.

Hereinafter, various exemplifying embodiments and implementations of the present invention and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures (including methods, apparatuses and computer program products) for enabling/realizing beam failure detection with different indication intervals, e.g. beam failure detection in a higher layer such as a MAC entity of a user equipment element or base station element.

Although the present invention and its embodiments are exemplified herein as an interaction between PHY/L1 and MAC, it is not limited to implementing specific functions at specific layers. As an example, the mechanisms described herein may be implemented in L1, in MAC or in both L1 and MAC.

Herein, any reference to a beam failure detection timer is meant to refer (for example) to the parameter beamFailure-DetectionTimer, specifically in the context of section 5.17 of the 3GPP specification TS 38.321 (Version 15.3.0) of 25 Sep. 2018. Similarly, any reference to a beam failure instance counter is meant to refer (for example) to the parameter BFI_COUNTER, specifically in the context of section 5.17 of the 3GPP specification TS 38.321 (Version 15.3.0) of 25 Sep. 2018.

FIG. 1 shows a flowchart illustrating an example of a method of beam failure detection, operable at a network element of a cellular radio access network, according to exemplifying embodiments of the present invention. The method of FIG. 1 is operable at or by (can be executed by) a UE or gNB in a 5G/NR radio access network in accordance with 3GPP (e.g. Release-15 onwards) specifications. More specifically, the method of FIG. 1 is operable (can be executed) on a MAC layer or—stated in other terms—by a MAC entity of such UE or gNB.

As shown in FIG. 1, a method according to exemplifying embodiments of the present invention comprises an operation (S1) of performing a beam failure detection procedure on the basis of beam failure instance indications from a lower layer, e.g. a PHY/L1 layer or a PHY/L1, using a beam failure detection timer, and an operation (S2) of controlling application of the beam failure detection timer in the beam failure detection procedure in view of indication intervals which are applicable for the beam failure instance indications from the lower layer, e.g. a PHY/L1 layer or a PHY/L1, in the beam failure detection procedure.

It is to be noted that the two operations illustrated in FIG. 1 have not to be executed sequentially and not in the illustrated sequence. For example, the controlling operation can be (repeatedly) executed in the course, i.e. in/during, the beam failure detection procedure or before each execution of the beam failure detection procedure.

According to exemplifying embodiments of the present invention, the operation of controlling application of the beam failure detection timer in the beam failure detection (and all related/involved sub-/operations, actions, etc.) can for example be specific/dedicated for or applicable/provided/achieved per MAC entity, serving cell (PCell/SCell), serving cell group (PCell & SCell(s) or only SCells), or the like.

For details regarding a beam failure detection procedure on the basis of beam failure instance indications from a lower layer using a beam failure detection timer according to exemplifying embodiments of the present invention, reference is made to the earlier PCT application No. PCT/EP2018/051416 of the same applicant/assignee and inventors, as filed on 22 Jan. 2018, from which the benefit of priority is claimed, and the entire contents of which is hereby incorporated by reference herein.

Figure 2:
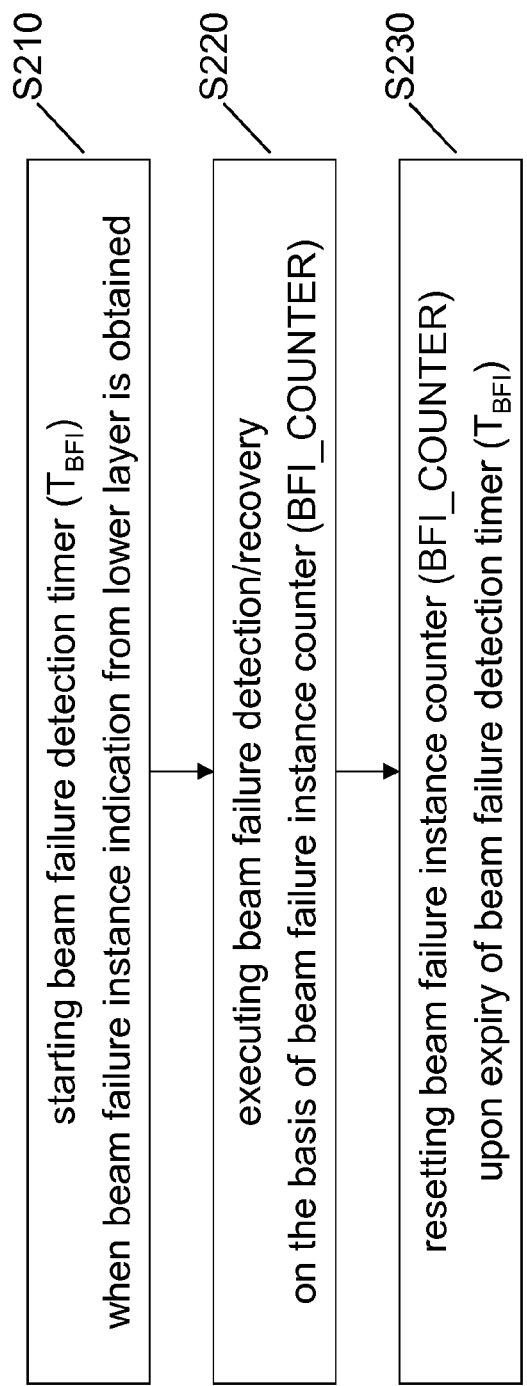
FIG. 2 shows a flowchart illustrating an example of a method of a beam failure detection procedure according to exemplifying embodiments of the present invention.

FIG. 2 shows a flowchart illustrating an example of a method of a beam failure detection procedure according to exemplifying embodiments of the present invention. The method of FIG. 2 represents an example of the operation (S1) of performing a beam failure detection procedure in the method of FIG. 1, and is thus operable at or by (can be executed by) the same element as the method of FIG. 1.

As shown in FIG. 2, a method according to exemplifying embodiments of the present invention comprises an operation (S210) of starting a beam failure detection timer $T_{BFI}$ when a beam failure instance indication from a lower layer, e.g. a PHY/L1 layer or a PHY/L1 entity, is obtained/received, an operation (S220) of executing beam failure detection, wherein a beam failure instance counter BFI_COUNTER is incremented whenever a beam failure instance indication from the lower layer, e.g. the PHY/L1 layer or the PHY/L1 entity, is obtained/received and beam failure is detected when the beam failure instance counter BFI_COUNTER reaches a beam failure instance threshold before expiry of the beam failure detection timer $T_{BFI}$, and an operation (S230) of resetting the beam failure instance counter BFI_COUNTER upon expiry of the beam failure detection timer $T_{BFI}$. In this regard, resetting means setting the beam failure instance counter BFI_COUNTER to its initially set or initialized value, namely e.g. 0.

In the exemplary sequence of FIG. 2, the controlling operation of FIG. 1 can be executed before the starting operation, after the resetting operation or in the course, i.e. in/during, the executing operation, for example.

It is to be noted that such basic principle of the present disclosure could be widely applied in the context of beam management, while beam failure detection is used herein as a non-limiting example. Irrespective thereof, the general concepts described herein are equally applicable for all such applications of beam management accordingly, including e.g. candidate beam detection.

Figure 3:
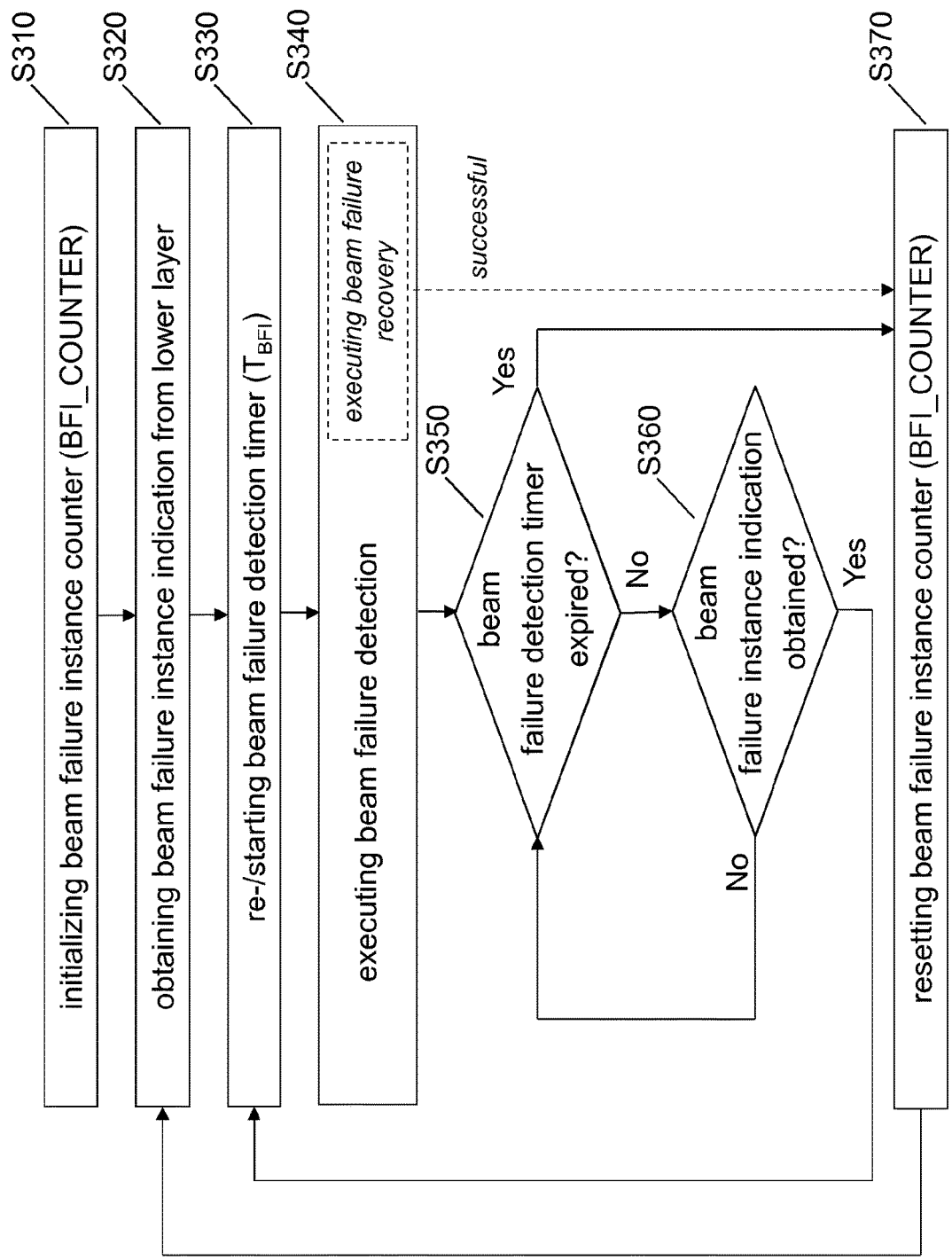
FIG. 3 shows a flowchart illustrating another example of a method of a beam failure detection procedure according to exemplifying embodiments of the present invention.

FIG. 3 shows a flowchart illustrating an example of another method of a beam failure detection procedure according to exemplifying embodiments of the present invention. The method of FIG. 3 represents an example of the operation (S1) of performing a beam failure detection procedure in the method of FIG. 1, and is thus operable at or by (can be executed by) the same element as the method of FIG. 1.

As shown in FIG. 3, a method according to exemplifying embodiments of the present invention comprises an operation (S310) of initializing a beam failure instance counter BFI_COUNTER to its initially set or initialized value, namely e.g. 0. Upon an operation (S320) of obtaining/receiving a beam failure instance indication from a lower layer, e.g. a PHY/L1 layer or a PHY/L1 entity, an operation (S330) of starting a beam failure detection timer $T_{BFI}$ is performed. Thereafter, an operation (S340) of executing beam failure detection/recovery, like in the method of FIG. 2, is performed, as described above. Therein, when beam failure is detected (as the beam failure instance counter BFI_COUNTER reaches a beam failure instance threshold), a beam failure recovery timer is started and the beam failure detection timer $T_{BFI}$ is stopped. Upon successfully completing beam failure recovery, the beam failure instance counter BFI_COUNTER is reset and the beam failure detection timer $T_{BFI}$ is restarted (when a subsequent beam failure instance indication is obtained/received). In or after execution of beam failure detection/recovery, there are an operation (S350) of determining whether the beam failure detection timer $T_{BFI}$ is expired and an operation (S360) of determining whether a (further) a beam failure instance indication from a lower layer, e.g. a PHY/L1 layer or a PHY/L1 entity, is obtained/received.

If it is determined that the beam failure detection timer $T_{BFI}$ is expired (YES in S350), the method proceeds to an operation (S370) of resetting the beam failure instance counter BFI_COUNTER and, then, returns to S320 to obtain/receive a subsequent beam failure instance indication from a lower layer, e.g. a PHY/L1 layer or a PHY/L1 entity. Otherwise, if it is determined that the beam failure detection timer $T_{BFI}$ is not expired (NO in S350), the method proceeds to S360.

If it is determined that a (further) a beam failure instance indication from a lower layer, e.g. a PHY/L1 layer or a PHY/L1 entity, is not obtained/received (NO in S360), the method returns to S350 to check expiry of the beam failure detection timer $T_{BFI}$. Otherwise, if it is determined that a (further) a beam failure instance indication from a lower layer, e.g. a PHY/L1 layer or a PHY/L1 entity, is obtained/received (YES in S360), the method returns to S330 to restarting the beam failure detection timer $T_{BFI}$.

In the exemplary method of FIG. 3, the beam failure detection timer $T_{BFI}$ is started when a first beam failure instance indication from the lower layer is obtained/received when/after the beam failure instance counter BFI_COUNTER is initialized or reset. Further, the beam failure detection timer $T_{BFI}$ is restarted whenever a further/subsequent beam failure instance indication from the lower layer is obtained/received.

In the exemplary sequence of FIG. 3, the controlling operation of FIG. 1 can be executed before or after the initializing operation, before or after the obtaining operation or in the course, i.e. in/during, the re-/starting operation, for example.

In the following, various non-limiting examples and implementations for the controlling operation of FIG. 1, i.e. the control of application of the beam failure detection timer according to exemplifying embodiments of the present invention are explained for illustrative purposes. In these explanations, it is exemplarily assumed that the element where the beam failure detection is performed is a UE, although it can naturally also be another network element of a cellular radio access network, e.g. a gNB in a 5G/NR radio access network Any one of the methods of FIGS. 4 to 7 represents an example of the operation (S2) of controlling application of the beam failure detection timer in the beam failure detection procedure in the method of FIG. 1, and is thus operable at or by (can be executed by) the same element as the method of FIG. 1.

The individual operations in any one of the methods of FIGS. 4 to 7 can for example be specific/dedicated for or applicable/provided/achieved per MAC entity, serving cell (PCell/SCell), serving cell group (PCell & SCell(s) or only SCells), or the like, respectively.

Figure 4:
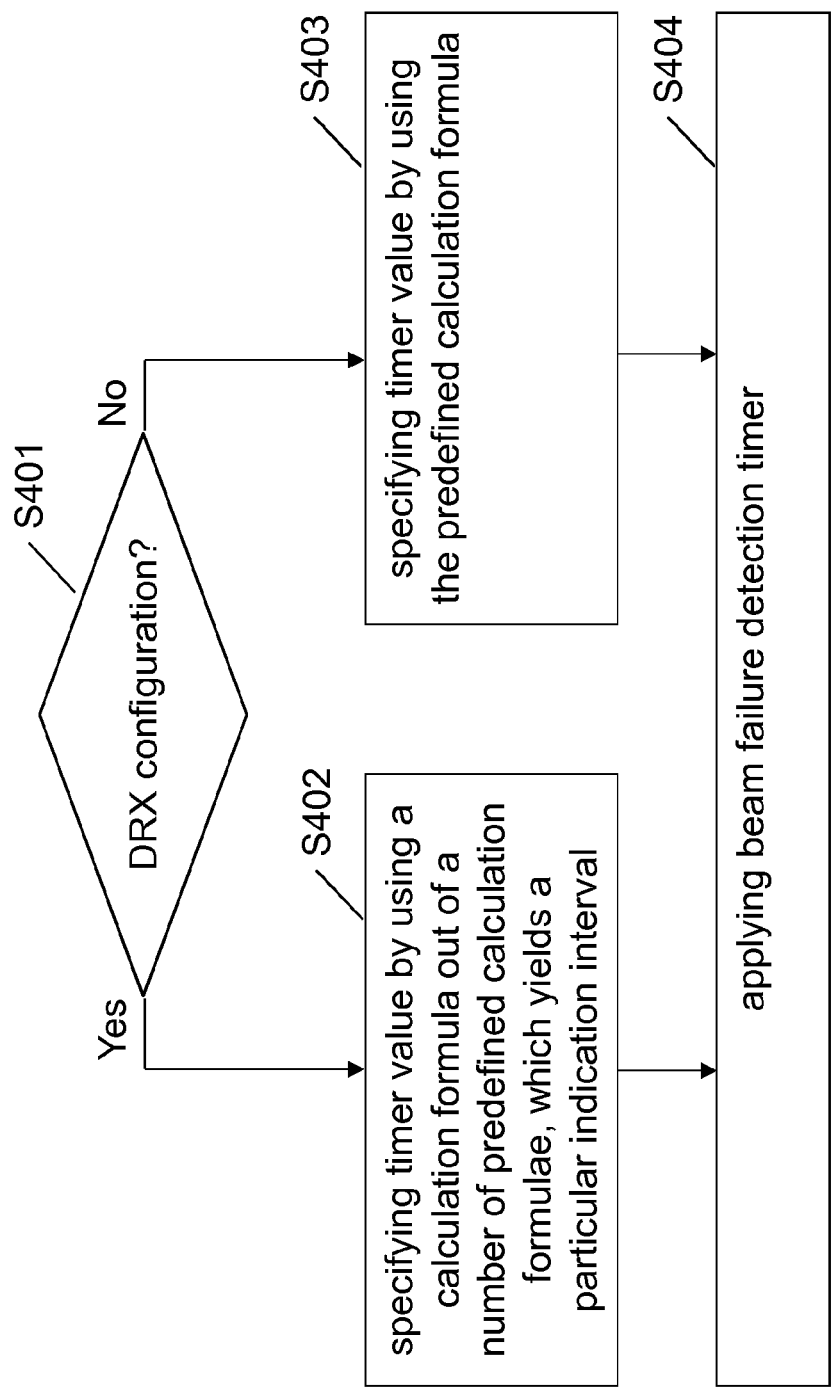
FIG. 4 shows a flowchart illustrating a first example of a method of controlling application of a beam failure detection timer in a beam failure detection procedure according to exemplifying embodiments of the present invention.

FIG. 4 shows a flowchart illustrating a first example of a method of controlling application of a beam failure detection timer in a beam failure detection procedure according to exemplifying embodiments of the present invention.

According to the example according to FIG. 4, application of the beam failure detection timer in the beam failure detection procedure is controlled based on a configuration of usability of discontinuous-reception (DRX), i.e. whether or not the UE is configured with DRX.

As shown in FIG. 4, a method according to exemplifying embodiments of the present invention comprises an operation (S402) of specifying a timer value of the beam failure detection timer by using a calculation formula out of a number of predefined calculation formulae, which yields a particular indication interval for the beam failure instance indications from the lower layer among all of the predefined calculation formulae in case the UE is configured with DRX (YES in S401). Otherwise, in case the UE is not configured with DRX (NO in S401), the method may comprise an operation (S403) of specifying a timer value of the beam failure detection timer by using the predefined calculation formula which is defined for this case, i.e. a DRX not-in-use case or a DRX not-configured setting.

In view of S402, it is to be noted that any indication interval of a particular (special) value or property can be adopted as the particular indication interval for the beam failure instance indications from the lower layer in case the UE is configured with DRX. For example, the shortest indication period could be adopted, i.e. the timer value of the beam failure detection timer can be specified by using that calculation formula (out of predefined or applicable formulae) which yields the shortest indication interval, or the longest indication period could be adopted, i.e. the timer value of the beam failure detection timer can be specified by using that calculation formula (out of predefined or applicable formulae) which yields the longest indication interval, or the period used in a certain DRX state (e.g. DRX not-in-use or DRX in-use state) could be adopted, i.e. the timer value of the beam failure detection timer can be specified by using that calculation formula (out of predefined or applicable formula) which yields the indication interval of the certain DRX state. A selection/choice of the appropriate indication interval (e.g. whether the shortest or longest indication interval is to be adopted) can be made depending on the needs and/or circumstances, the amount of the actual values resulting from the predefined or applicable formulae, the relation of the actual values resulting from the predefined or applicable formulae to a reference value such as e.g. the DRX cycle, or the like.

Thereby, the timer value of the beam failure detection timer is fixedly/statically determined, namely irrespective of the actual/current PHY/L1 indication interval.

In this regard, the timer value being specified represents the (maximum) duration or running time until lapse/expiry of the beam failure detection timer. It is agreed that the timer value of the beam failure detection timer is defined as an integer multiple of the indication interval for the beam failure instance indications, i.e. the reporting period (or periodicity) of the reference signal or signals used for beam failure detection, from the PHY/L1 layer to the MAC layer. Accordingly, the timer value can be specified with the calculated (shortest) PHY/L1 indication interval being multiplied by a predetermined factor (integer).

The beam failure detection timer with the thus specified timer value is then applied for beam failure detection (S404).

That is, the beam failure detection procedure can be performed using the beam failure detection timer with the specified timer value.

In the operation S402, the beam failure detection timer value is determined from the predefined formula for $T_{Indication\_interval\_BFD}$ which gives the shortest reporting period when the DRX is configured for the UE.

The predefined calculation formulae for $T_{Indication\_interval\_BFD}$ are generally those which are defined for a DRX not-in-use case (i.e. DRX is not used) or a DRX not-configured setting (i.e. DRX is not configured) and for a DRX in-use case for DRX configured setting (i.e. DRX is (configured and) used). Generally, it is herein assumed that a case where the UE is not configured with DRX is equivalent to a case where the DRX is not in use (despite the UE being configured with DRX).

For example, referring to 3GPP specification 38.133 (Version 15.3.0) of 3 Oct. 2018, section 8.5.4, the relevant formula can be as follows.

When DRX is not used or DRX is not configured, $T_{Indication\_interval\_BFD}$ is max(2 ms, $T_{BFD-RS,M}$), where $T_{BFD-RS,M}$ is the shortest periodicity of all configured RS resources for beam failure detection, which corresponds to $T_{SSB}$ if a RS resource is SSB, or $T_{CSI-RS}$ if a RS resource is CSI-RS.

When DRX is used, $T_{Indication\_interval\_BFD}$ is max (1.5*DRX_cycle_length, 1.5*$T_{BFD-RS,M}$) if DRX_cycle_length is less than or equal to 320 ms, and $T_{Indication\_interval}$ is DRX_cycle_length if DRX_cycle_length is greater than 320 ms.

Hence, in the operation S402, it can be tested which one of the two relevant formulae yields the shorter reporting period and thus the shorter indication interval, and this formula is adopted for calculation of $T_{Indication\_interval\_BFD}$ to be used for specifying the timer value of the beam failure detection timer.

In the operation S403, the beam failure detection timer value is determined from the only relevant formula when the DRX is not configured for the UE.

For the operation S404, there are various options such as e.g. the following.

The beam failure detection timer can not be considered expired before occurrence of a next possible beam failure instance indication according to the current indication interval, if the current indication interval for the beam failure instance indications from the lower layer changes while the beam failure detection timer is running, or if the current indication interval for the beam failure instance indications from the lower layer is larger than the specified timer value of the beam failure detection timer. Stated in other words, this applies in case the PHY/L1 indication interval changes when the beam failure detection timer is running and if the beam failure detection timer would expire before the next possible (position of a) PHY/L1 indication instance (as dictated by the new $T_{Indication\_interval\_BFD}$), or in case $T_{Indication\_interval\_BFD}$>beam failure detection timer value (e.g. for the case the UE continues to be in DRX for multiple $T_{Indication\_interval\_BFD}$ durations).

In this regard, the current indication interval for beam failure instance indications can change due a change of at least one of a discontinuous-reception usage state (e.g. if the DRX usage state shifts from/into in-use state into/from not-in-use state), a discontinuous-reception cycle time, a periodicity of a reference signal used for the beam failure instance indications from the lower layer (such as e.g. $T_{SSB}$ or $T_{CSI-RS}$), a downlink bandwidth part (such as e.g. the active BWP), an activation of a new or an alternative transmission configuration indicator (TCI) state for PDCCH reception (such as e.g. the active TCI state for PDCCH reception for CORESET), and a change of the active transmission configuration indicator (TCI) state for PDCCH reception.

The beam failure detection timer can be restarted when a beam failure instance indication is obtained upon occurrence of the next possible beam failure instance indication according to the current indication interval, and/or the beam failure detection timer can be considered expired when a beam failure instance indication is not obtained upon occurrence of the next possible beam failure instance indication according to the current indication interval. Namely, if a beam failure instance indication is received in a next possible (position of a) PHY/L1 indication instance (as dictated by the new $T_{Indication\_interval\_BFD}$), the beam failure detection timer can be restarted, while otherwise the beam failure detection timer can be considered expired and the BFI_COUNTER can be reset.

In terms of a MAC specification, the example according to FIG. 4 could for example be summarized, in the context of section 5.17 of the 3GPP specification TS 38.321 (Version 15.3.0) of 25 Sep. 2018, by the following additional statement (or some similar wording): If the beam failure detection indication interval changes while the beamFailureDetectionTimer is running or if the current $T_{Indication\_interval\_BFD}$ (as specified in TS 38.133 subclause 8.5.4) is longer than beamFailureDetectionTimer, the MAC entity shall not consider the beamFailuredetectionTimer expired before the next possible occasion where the beam failure instance indication can be received from lower layers.

In terms of a RRC specification, the example according to FIG. 4 could for example be summarized, in the context the definition of beamFailureDetectionTimer of the 3GPP specification TS 38.331 (Version 15.3.0) of 26 Sep. 2018, by the following description (or some similar wording): Value in number of "$Q_{out,LR}$ reporting periods of Beam Failure Detection" Reference Signal (see 38.213, section 6) which is based on the shortest calculated reporting period when DRX is configured (see 38.133, section 8.5.4).

According to the example according to FIG. 4, as outlined above, a single BFD timer value can be applied for the beam failure detection procedure even though the PHY/L1 indication interval is changing. Thereby, the beam failure detection operation (and the thus required specifications/agreements for the functioning of a corresponding network element) is simplified.

Figure 5:
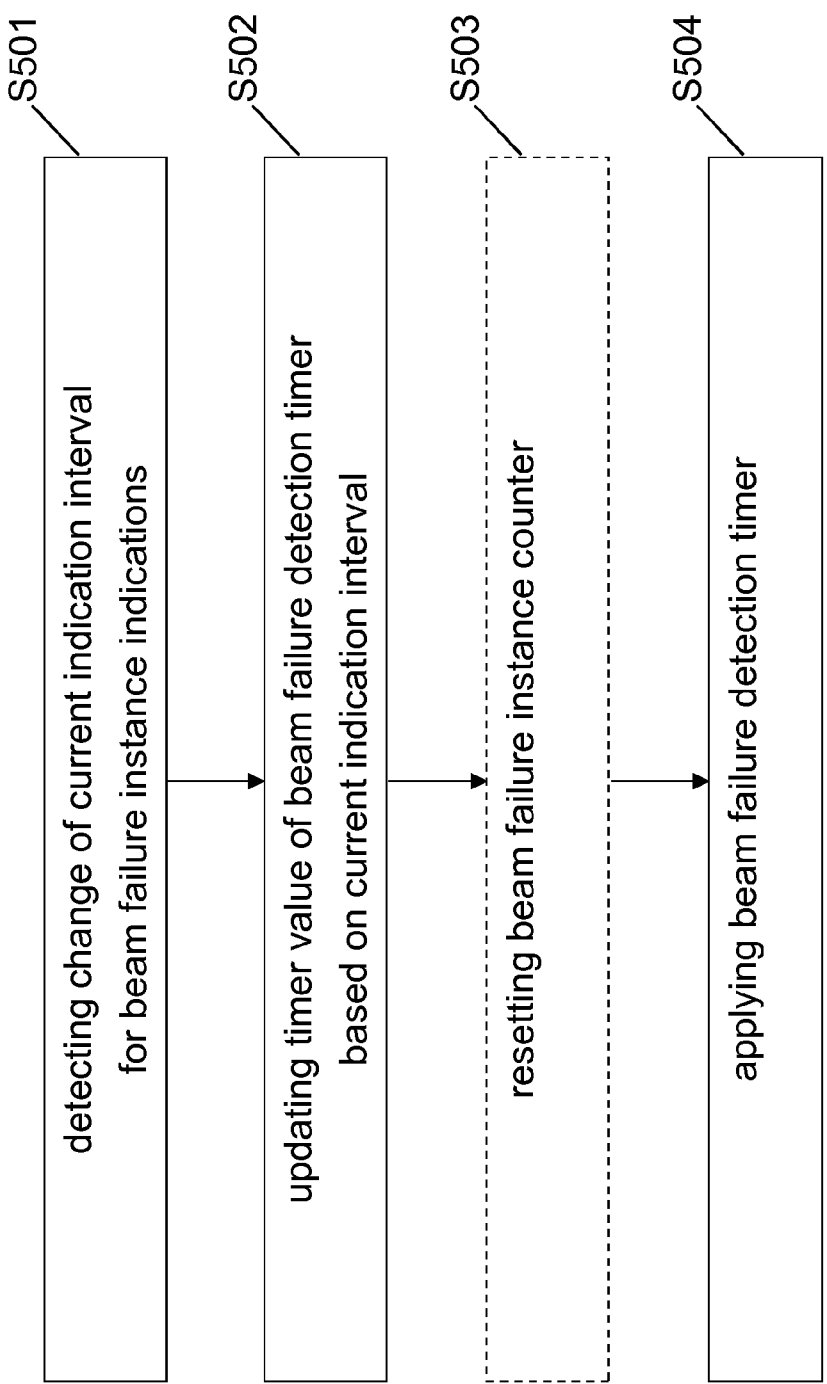
FIG. 5 shows a flowchart illustrating a second example of a method of controlling application of a beam failure detection timer in a beam failure detection procedure according to exemplifying embodiments of the present invention.

FIG. 5 shows a flowchart illustrating a second example of a method of controlling application of a beam failure detection timer in a beam failure detection procedure according to exemplifying embodiments of the present invention.

According to the example according to FIG. 5, application of the beam failure detection timer in the beam failure detection procedure is controlled based on a change of the current indication interval (PHY/L1 indication interval) for the beam failure instance indications from the lower layer.

As shown in FIG. 5, a method according to exemplifying embodiments of the present invention comprises an operation (S502) of updating a timer value of the beam failure detection timer based on the current indication interval for the beam failure instance indications from the lower layer when the current indication interval changes in case the current indication interval for beam failure detection indications changes or has changed (which is detected in S501). In this regard, the current indication interval for beam failure instance indications can change due a change of at least one of a discontinuous-reception usage state (e.g. if the DRX usage state shifts from/into in-use state into/from not-in-use state), a discontinuous-reception cycle time, a periodicity of a reference signal used for the beam failure instance indications from the lower layer (such as e.g. $T_{SSB}$ or $T_{CSI-RS}$), a downlink bandwidth part (such as e.g. the active BWP), an activation of a new or an alternative transmission configuration indicator (TCI) state for PDCCH reception (such as e.g. the active TCI state for PDCCH reception for CORESET), and a change of the active transmission configuration indicator (TCI) state for PDCCH reception.

Thereby, the timer value of the beam failure detection timer is dynamically determined, namely depending on the actual/current PHY/L1 indication interval.

In this regard, the timer value being updated represents the (maximum) duration or running time until lapse/expiry of the beam failure detection timer. It is agreed that the timer value of the beam failure detection timer is defined as an integer multiple of the indication interval for the beam failure instance indications, i.e. the reporting period (or periodicity) of the reference signal or signals used for beam failure detection, from the PHY/L1 layer to the MAC layer. Accordingly, the timer value can be updated with the changed PHY/L1 indication interval being multiplied by the same factor (integer) as beforehand.

As indicated by dashed lines in FIG. 5, the thus illustrated example method may optionally also comprises an operation (S503) of resetting the beam failure instance counter (BFI_COUNTER) upon timer value update. Despite the illustration in FIG. 5, the resetting operation can equally be executed at another stage/position, e.g. together with or in the updating operation, after the applying operation, or the like.

The beam failure detection timer with the thus updated timer value is then applied for beam failure detection (S504). That is, the beam failure detection procedure can be performed using the beam failure detection timer with the updated timer value.

In the operation S502, the timer value of the beam failure detection timer is changed dynamically, and the timer value is determined from the predefined formula for $T_{Indication\_interval\_BFD}$. That is, depending on whether or not DRX is in use or DRX is configured and, if DRX is (configured) and in use, the DRX cycle time, the relevant formula is used for calculating the applicable timer value based on the current (changed PHY/L1 indication period). In this regard, the same formulae as indicated above in connection with the example of FIG. 4 are equally applicable.

The timer value can be updated in the next possible (position of a) PHY/L1 indication instance after the PHY/L1 indication interval has changed.

For the operation S504, there are various options such as e.g. the following.

The beam failure detection timer can not be considered expired before occurrence of a next possible beam failure instance indication according to the current (i.e. changed) indication interval. Similarly to the example of FIG. 4, in case the beam failure detection timer would expire before the next possible (position of a) PHY/L1 indication instance (as dictated by the new $T_{Indication\_interval\_BFD}$), the beam failure detection timer can not be considered expired before the next possible (position of a) PHY/L1 indication instance.

The beam failure detection timer can be restarted with the updated timer value when a beam failure instance indication is obtained upon occurrence of the next possible beam failure instance indication according to the current (i.e. changed) indication interval, or upon updating of the timer value. Namely, if a beam failure instance indication is received in a next possible (position of a) PHY/L1 indication instance (as dictated by the new $T_{Indication\_interval\_BFD}$), the beam failure detection timer can be restarted with the updated timer value, while otherwise the beam failure detection timer can be considered expired and the BFI_COUNTER can be reset.

In any case, the beam failure detection timer can optionally be restarted always when the timer value is updated.

According to the example according to FIG. 5, as outlined above, the BFD timer value can be adjusted based on the PHY/L1 indication interval currently in use. Thereby, the beam failure detection operation can be performed in equal manner/effectiveness, for any PHY/L1 indication interval and thus for any DRX usage state.

Figure 6:
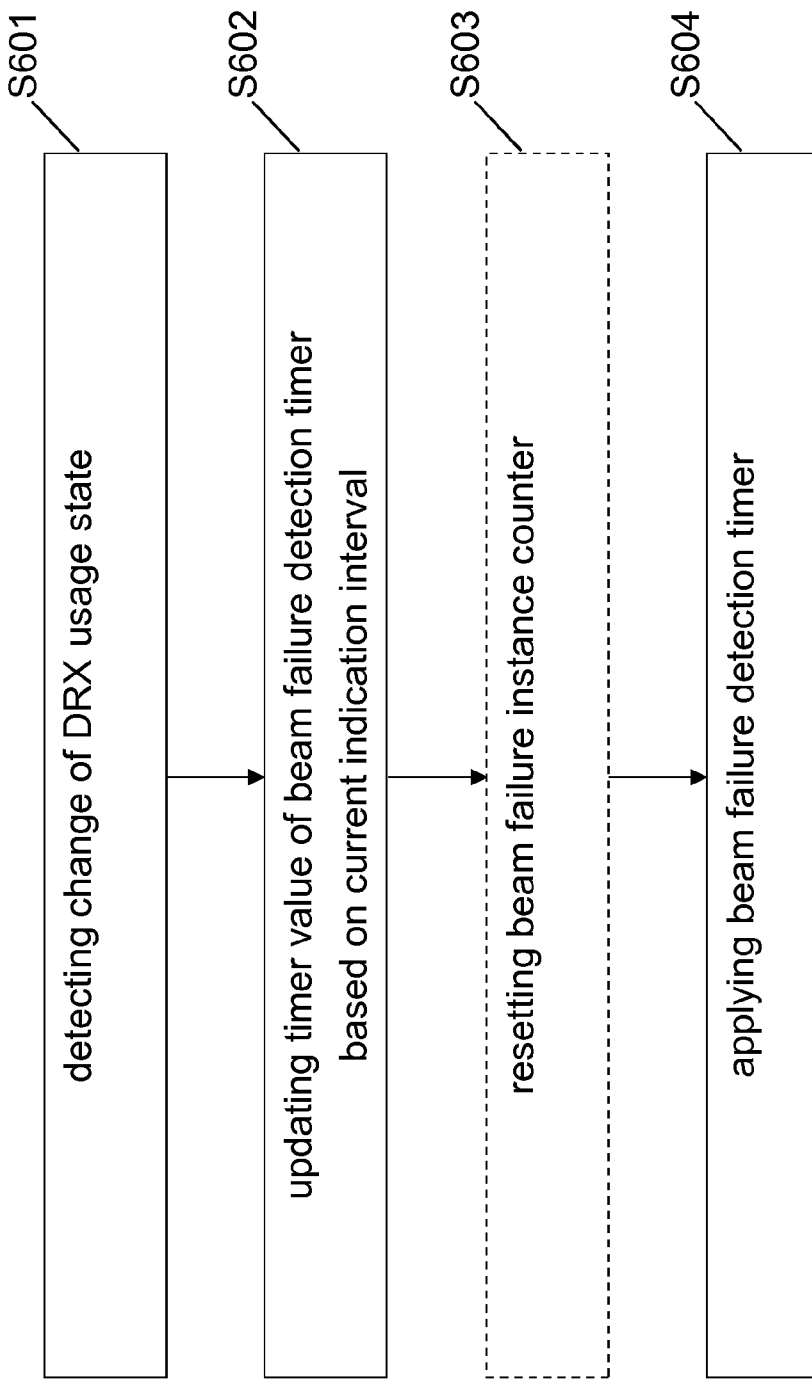
FIG. 6 shows a flowchart illustrating a third example of a method of controlling application of a beam failure detection timer in a beam failure detection procedure according to exemplifying embodiments of the present invention.

FIG. 6 shows a flowchart illustrating a third example of a method of controlling application of a beam failure detection timer in a beam failure detection procedure according to exemplifying embodiments of the present invention.

According to the example according to FIG. 6, application of the beam failure detection timer in the beam failure detection procedure is controlled based on a change of a discontinuous-reception (DRX) usage state. Here, it is to be noted that a change of a discontinuous-reception (DRX) usage state leads to a change of the current indication interval (PHY/L1 indication interval) for the beam failure instance indications from the lower layer.

As shown in FIG. 6, a method according to exemplifying embodiments of the present invention comprises an operation (S602) of updating a timer value of the beam failure detection timer based on the current indication interval for the beam failure instance indications from the lower layer when the discontinuous-reception usage state changes (which is detected in S601). As mentioned above, the current indication interval for beam failure instance indications thus changes due a change the discontinuous-reception usage state (e.g. if the DRX usage state shifts from/into in-use state into/from not-in-use state).

Thereby, the timer value of the beam failure detection timer is dynamically determined, namely depending on the actual/current DRX usage state and, thus, the actual/current PHY/L1 indication interval.

In this regard, the timer value being updated represents the (maximum) duration or running time until lapse/expiry of the beam failure detection timer. It is agreed that the timer value of the beam failure detection timer is defined as an integer multiple of the indication interval for the beam failure instance indications, i.e. the reporting period (or periodicity) of the reference signal or signals used for beam failure detection, from the PHY/L1 layer to the MAC layer. Accordingly, the timer value can be updated with the changed PHY/L1 indication interval being multiplied by the same factor (integer) as beforehand.

In S601, detection of a change of the DRX usage state can for example be detected according to the requirements specified in section 3.6.1 of the 3GPP specification TS 38.133 (Version 15.3.0) of 3 Oct. 2018. Specifically, for the requirements in RRC connected state, the UE shall assume that no DRX is used provided when the following conditions are met (while otherwise the UE shall assume that DRX is used):

DRX parameters are not configured or
DRX parameters are configured and
  drx-InactivityTimer is running or
  drx-RetransmissionTimerDL is running or
  drx-RetransmissionTimerUL is running or
  ra-ContentionResolutionTimer is running or
  a Scheduling Request sent on PUCCH is pending or
  a PDCCH indicating a new transmission addressed to the C-RNTI of the MAC entity has not been received after successful reception of a Random Access Response for the preamble not selected by the MAC entity.

As indicated by dashed lines in FIG. 6, the thus illustrated example method may optionally also comprises an operation (S603) of resetting the beam failure instance counter (BFI_COUNTER) upon timer value update. Despite the illustration in FIG. 6, the resetting operation can equally be executed at another stage/position, e.g. together with or in the updating operation, after the applying operation, or the like.

The beam failure detection timer with the thus updated timer value is then applied for beam failure detection (S604). That is, the beam failure detection procedure can be performed using the beam failure detection timer with the updated timer value.

In the operation S602, the timer value of the beam failure detection timer is changed dynamically, and the timer value is determined from the predefined formula for $T_{Indication\_interval\_BFD}$. That is, depending on whether or not DRX is in use and, if DRX is in use, the DRX cycle time, the relevant formula is used for calculating the applicable timer value based on the current (changed PHY/L1 indication period). In this regard, the same formulae as indicated above in connection with the example of FIG. 4 are equally applicable.

The timer value can be updated in the next possible (position of a) PHY/L1 indication instance after the PHY/L1 indication interval has changed.

For the operation S604, there are various options such as e.g. the following.

For example, the beam failure detection timer can be restarted (and the updated timer value thereof, which is based on the changed $T_{Indication\_interval\_BFD}$, can be applied) immediately when the indication interval changes, e.g. when the UE inactivity timer/retransmission timer/s expire (when the UE enters the DRX in-use state) or when the inactivity timer/retransmission timer/s is/are started (when the UE enters the DRX not-in-use state, e.g. when the UE detects a PDCCH transmission to it).

For any one of the above-described examples of FIGS. 5 and 6, one or more of the following options/variants are applicable The timer value can be updated after occurrence of a next possible beam failure instance indication according to the previous indication interval prior to the change thereof. That is, the new value of $T_{Indication\_interval\_BFD}$ can be applied after the next PHY/L1 indication instance being calculated based on the old value of $T_{Indication\_interval\_BFD}$ (or, the old value of the timer).

The beam failure detection timer can be considered expired when the beam failure detection timer has already run longer than the updated timer value upon updating of the timer value. That is, if the timer has run longer than the new timer value upon the timer value update, the timer can be considered expired immediately.

When the timer value is updated while the beam failure detection timer is running, a time already elapsed with the previous timer value can be considered for the remaining running time of the beam failure detection timer. That is, after updating the timer value, the remaining time considered without beam failure instance indication can take into account the periods that the timer already elapsed with the previous timer value. For instance, if the beam failure detection timer is configured to account 4 PHY/L1 indication intervals and the timer value is updated after 2 PHY/L1 indication intervals have elapsed with the old timer value, it is considered that only 2 PHY/L1 indication intervals are remaining with the new timer value for the current run of the beam failure detection timer (i.e., without restart). So, the new time can be applied for the remaining 2 PHY/L1 indication intervals (instead of a full range of 4 PHY/L1 indication intervals).

A beam failure instance counter, which is incremented whenever a beam failure instance indication from the lower layer is obtained, can be reset upon updating of the timer value. That is, the BFI_COUNTER can be reset upon timer value update.

If the beam failure detection indication interval $T_{Indication\_interval\_BFD}$ changes, the MAC entity can restart the beam failure detection timer and apply the new (i.e. changed) value of $T_{Indication\_interval\_BFD}$ (and thus the new (i.e. updated) timer value) starting from the beginning of the next slot (where the radio link quality is assessed).

If the beam failure detection indication interval $T_{Indication\_interval\_BFD}$ changes, the MAC entity can restart the beam failure detection timer and apply the new (i.e. changed) value of $T_{Indication\_interval\_BFD}$ (and thus the new (i.e. updated) timer value) on/from the next beam failure indication instance.

The MAC entity can restart the beam failure detection timer and apply the new (i.e. changed) value of $T_{Indication\_interval\_BFD}$ (and thus the new (i.e. updated) timer value) when the MAC entity enters a DRX in-use state and the beam failure detection indication interval $T_{Indication\_interval\_BFD}$ changes.

The MAC entity can restart the beam failure detection timer and apply the new (i.e. changed) value of $T_{Indication\_interval\_BFD}$ (and thus the new (i.e. updated) timer value) when the MAC entity enters a DRX not-in-use state and the beam failure detection indication interval $T_{Indication\_interval\_BFD}$ changes.

Figure 7:
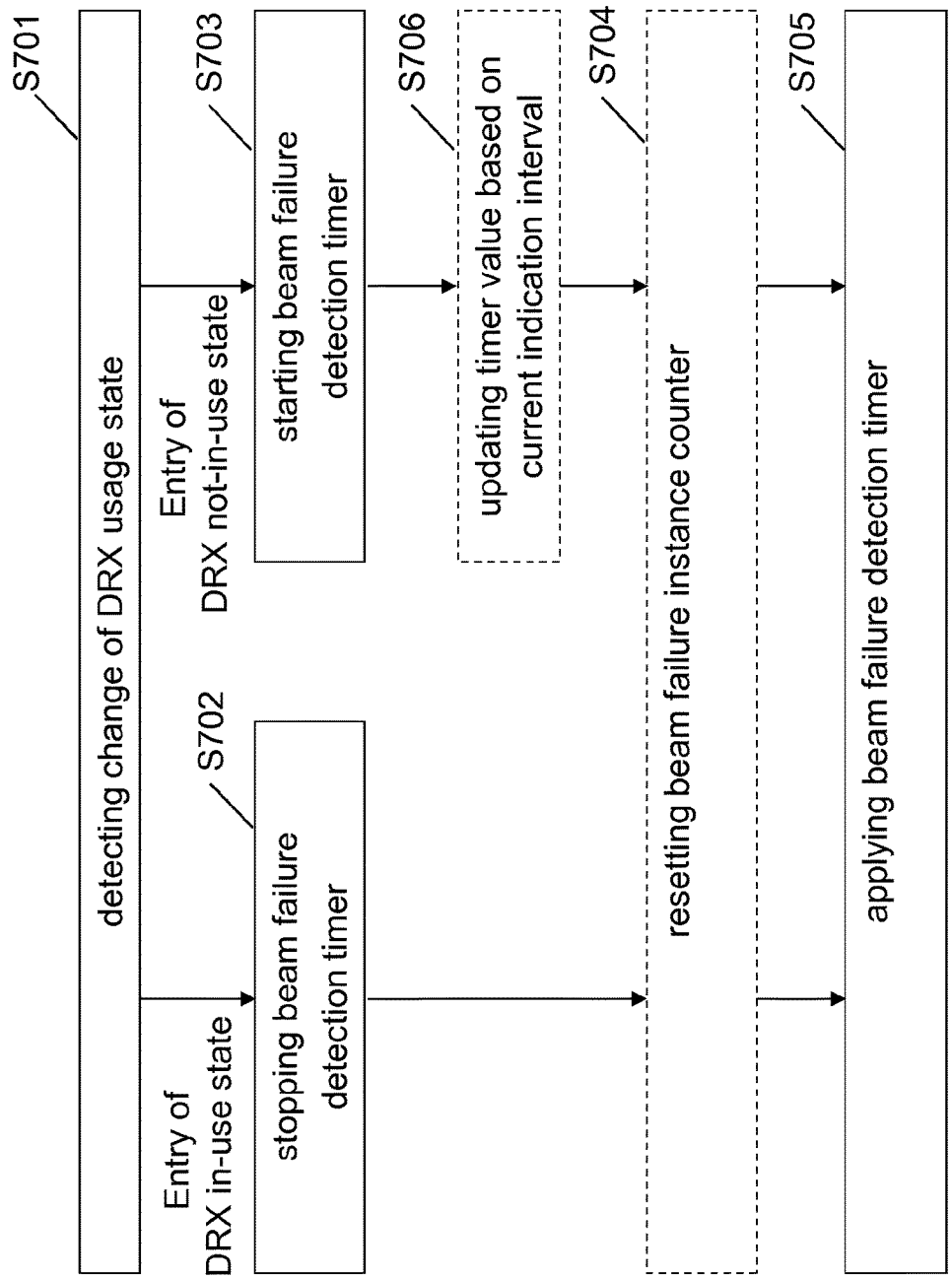
FIG. 7 shows a flowchart illustrating a fourth example of a method of controlling application of a beam failure detection timer in a beam failure detection procedure according to exemplifying embodiments of the present invention.

According to the example according to FIG. 7, as outlined above, the BFD timer value can be adjusted based on the PHY/L1 indication interval currently in use. Thereby, the beam failure detection operation can be performed in equal manner/effectiveness, for any DRX usage state and thus for any PHY/L1 indication interval (corresponding thereto).

FIG. 7 shows a flowchart illustrating a fourth example of a method of controlling application of a beam failure detection timer in a beam failure detection procedure according to exemplifying embodiments of the present invention.

According to the example according to FIG. 7, application of the beam failure detection timer in the beam failure detection procedure is controlled based on a change of a discontinuous-reception (DRX) usage state.

As shown in FIG. 7, a method according to exemplifying embodiments of the present invention comprises an operation (S702) of stopping the beam failure detection timer when the discontinuous-reception usage state enters into a discontinuous-reception in-use state (according to a detection of a DRX usage state change in S701), and/or an operation (S703) of starting the beam failure detection timer when the discontinuous-reception usage state enters into a discontinuous-reception not-in-use state (according to a detection of a DRX usage state change in S701).

Thereby, the operation/running of the beam failure detection timer is dynamically controlled, namely depending on the actual/current DRX usage state.

In S701, detection of a change of the DRX usage state can for example be detected according to the requirements specified in section 3.6.1 of the 3GPP specification TS 38.133 (Version 15.3.0) of 3 Oct. 2018. For details, reference is made to the associated description for S601 above.

As indicated by dashed lines in FIG. 7, the thus illustrated example method may optionally also comprises an operation (S704) of resetting the beam failure instance counter (BFI_COUNTER) upon stopping the beam failure detection timer and/or upon starting the beam failure detection timer. That is, the resetting operation may only be done in some case, and may not be done in other cases. Despite the illustration in FIG. 7, if done, the resetting operation may equally be executed at another stage/position, e.g. together with or in the stopping/starting operation, after the applying operation, or the like.

The beam failure detection timer, in the thus stopped/started condition/mode, is then applied for beam failure detection (S705). That is, the beam failure detection procedure can be performed using the beam failure detection timer, whether in started or stopped condition/mode.

In view of the above, the beam failure detection timer can be stopped when the UE (i.e. its MAC entity) enters a DRX in-use state and started when the UE (i.e. its MAC entity) enters a DRX not-in-use state. The BFI_COUNTER can not be reset upon stopping and/or starting the beam failure detection timer. Alternatively, the BFI_COUNTER can be reset upon stopping and/or starting the beam failure detection timer, which leads to dedicated BFD detection procedures for DRX in-use and DRX not-in-use states (due to counter reset upon respective state entries) where in the DRX in-use state only the beam failure instance indications are counted without being able to reset the BFI_COUNTER (due to the beam failure detection timer being stopped, i.e. not running). Additionally, the beam failure detection timer can not be restarted if a beam failure instance indication is received during the DRX in-use state. In one example, the beam failure instance indications received during the DRX in-use state are ignored, leading to beam failure detection only during DRX not-in-use state.

For the operation S705, there are various options such as e.g. the following.

The beam failure detection timer can be started from a time already elapsed upon stopping the beam failure detection timer (in S702) when a beam failure instance indication is not obtained during the discontinuous-reception (DRX) in-use state. That is, when the discontinuous-reception (DRX) not-in-use state is entered, subsequent to entry of the discontinuous-reception (DRX) in-use state and beam failure detection therein (i.e. a sequence of S702 and S705), the beam failure detection timer is started (in S703), yet not with its initially set or initialized value, namely e.g. 0, but the value at which it has previously been stopped (in S702). Accordingly, in this case, the beam failure detection timer is not restarted but continued.

Additionally or alternatively, the beam failure detection timer can be restarted when a beam failure instance indication is obtained during the discontinuous-reception (DRX) in-use state. That is, when the discontinuous-reception (DRX) not-in-use state is entered, initially or subsequent to entry of the discontinuous-reception (DRX) in-use state and beam failure detection therein, the beam failure detection timer is restarted (in S703), with its initially set or initialized value, namely e.g. 0.

In addition to the above-described timer stopping/starting functionality (in which the operation/running of the beam failure detection timer is dynamically controlled depending on the actual/current DRX usage state), the timer value of the beam failure detection timer can be dynamically determined depending on the actual/current DRX usage state and, thus, the actual/current PHY/L1 indication interval. Here, it is to be noted that a change of a discontinuous-reception (DRX) usage state leads to a change of the current indication interval (PHY/L1 indication interval) for the beam failure instance indications from the lower layer.

Accordingly, as indicated by dashed lines in FIG. 7, the thus illustrated example method may optionally also comprises an operation (S706) of updating a timer value of the beam failure detection timer based on the current indication interval for the beam failure instance indications from the lower layer in the discontinuous-reception (DRX) not-in-use state.

In the operation S706, the timer value of the beam failure detection timer can be changed dynamically, and the timer value is determined from an applicable predefined formula for $T_{Indication\_interval\_BFD}$, i.e. a calculation formula which is predefined for the discontinuous-reception (DRX) not-in-use state. That is, the relevant formula is used for calculating the applicable timer value based on the current (changed PHY/L1 indication period). In this regard, the same formulae as indicated above in connection with the example of FIG. 4 are equally applicable. Despite the illustration in FIG. 7, the updating operation can equally be executed at another stage/position, e.g. before the starting operation, together with or in the starting operation, after the resetting operation, after the applying operation, or the like.

According to the example according to FIG. 7, as outlined above, the BFD timer can be operated according to a DRX usage state. Thereby, a simple implementation can be achieved, while nevertheless providing for an effective beam failure detection operation in view of changing conditions.

According to exemplary embodiments of the present invention, application of the beam failure detection timer in the beam failure detection procedure can be (controlled to be) disabled or disregarded when DRX is in use.

In this regard, the maximum value of the beam failure instance counter (e.g. the parameter beamFailureInstanceMaxCount in section 5.17 of the 3GPP specification TS 38.321 (Version 15.3.0) of 25 Sep. 2018) can be (considered to be) set to 1 when DRX is in use. That is, when the UE is in a DRX in-use-state, the UE (or its MAC entity) will detect beam failure (a beam failure event) for any beam failure instance indication from the PHY/L1 layer. Accordingly, in this case, the procedures of FIGS. 2 and 3 can be omitted in the context of beam failure detection.

According to this example, as outlined above, the BFD timer can be disabled or disregarded when DRX is in use, as timer operation is useless when any beam failure instance indication leads to beam failure detection.

Additionally or alternatively in any of the methods or examples described herein the beam failure detection timer may generally be reset/restarted, not reset i.e. continued, stopped, or reset and stopped.

By virtue of exemplifying embodiments of the present invention, as evident from the above, beam failure detection with different indication intervals, e.g. beam failure detection in a higher layer such as a MAC entity of a user equipment element or base station element, can be enabled/realized in an effective/improved manner. Thereby, a measure/mechanism is provided for overcoming or at least mitigating conventional problems, as initially described.

By way of exemplifying embodiments of the present invention, it can be ensured that the beam failure detection procedure could work properly despite the fact that the indication interval for the beam failure instance indications, i.e. the reporting period (or periodicity) of the reference signal or signals used for beam failure detection, from the PHY/L1 layer to the MAC layer, can dynamically change even during the beam failure detection procedure, due to various reasons or conditions. Stated in other words, it can be ensured that the beam failure detection timer is appropriately applied in the beam failure detection procedure in view of varying or even dynamically changing PHY/L1 instance indication intervals. Hence, it is enabled that the beam failure detection procedure accounts for different (i.e. varying or even dynamically changing) PHY/L1 instance indication intervals.

By way of exemplifying embodiments of the present invention, beam failure detection can also be performed during DRX (discontinuous reception) when the PHY/L1 indication interval may be much longer than when not in DRX. Hence, it can be ensured that the beam failure detection timer does not expire before the next possible (position of a) PHY/L1 indication interval, and/or that the beam failure detection timer does not unnecessarily detect an excessive number or frequency of beam failure detection events.

The aforementioned techniques are advantageous in any deployments regarding radio link management and radio resource control for a radio link between a user equipment element and a base station element, e.g. between UE and gNB in a 3GPP 5G/NR (e.g. Release-15 onwards) system, wherein the radio link is based on one or more beams subject to beam management.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 8 and 9, while for the sake of brevity reference is made to the detailed description of respective corresponding configurations/setups, schemes, methods and functionality, principles and operations according to FIGS. 1 to 7.

Figure 8:
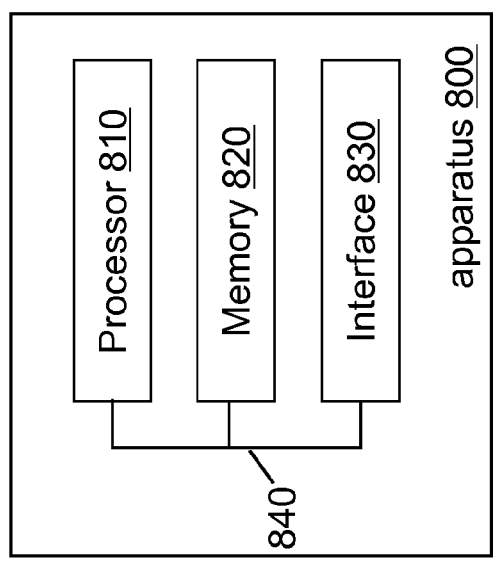
FIG. 8 shows a schematic diagram illustrating an example of a structure of an apparatus according to exemplifying embodiments of the present invention.
Figure 9:
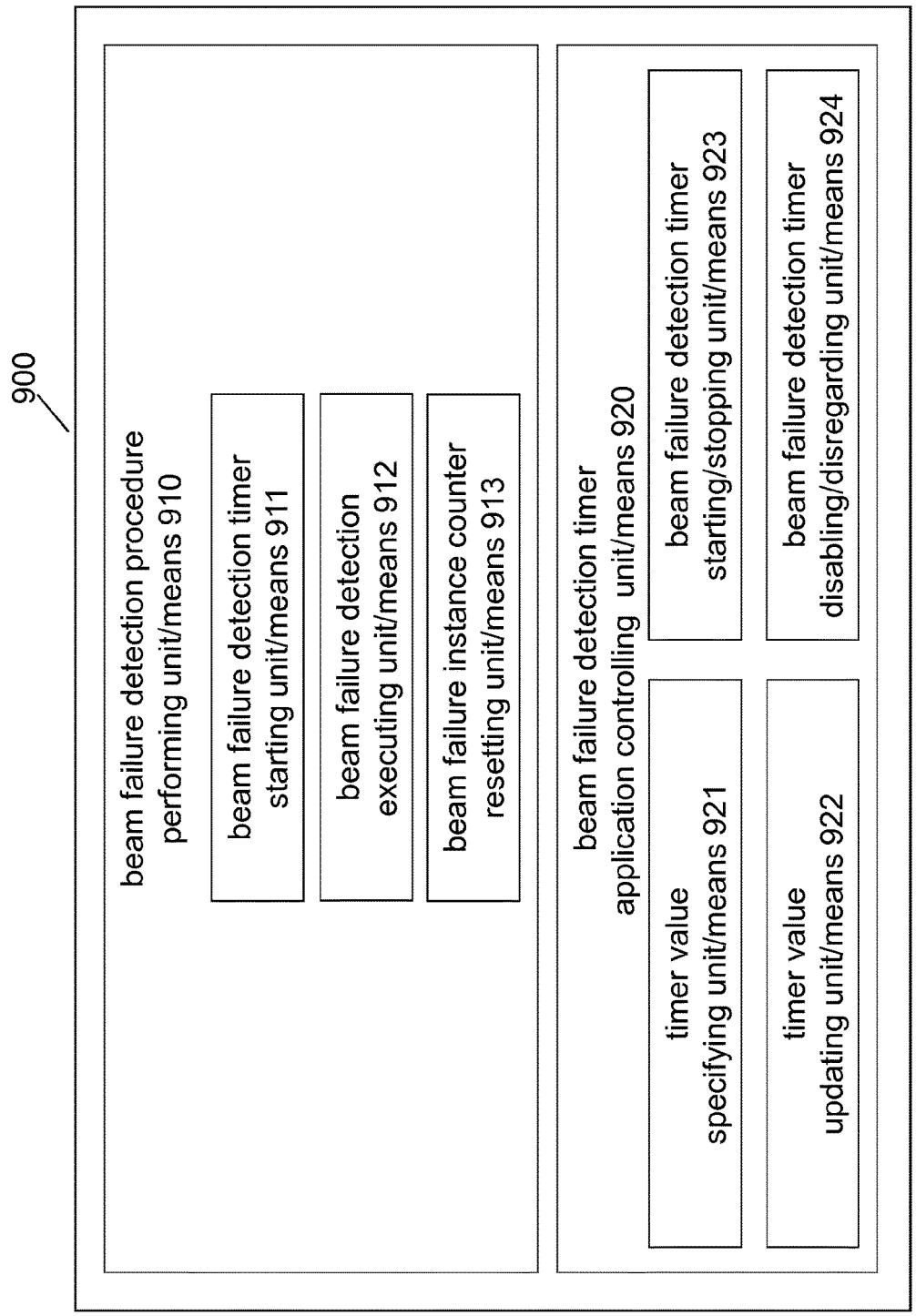
FIG. 9 shows a schematic diagram illustrating another example of a functional structure of an apparatus according to exemplifying embodiments of the present invention.

In FIGS. 8 and 9, the blocks are basically configured to perform respective methods, procedures and/or functions as described above. The entirety of blocks are basically configured to perform the methods, procedures and/or functions as described above, respectively. With respect to FIGS. 8 and 9, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 8 and 9, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 8 shows a schematic diagram illustrating an example of a structure of an apparatus according to exemplifying embodiments of the present invention.

As indicated in FIG. 8, according to exemplifying embodiments of the present invention, an apparatus 800 may comprise at least one processor 810 and at least one memory 820 (and possibly also at least one interface 830), which may be operationally connected or coupled, for example by a bus 840 or the like, respectively.

The processor 810 and/or the interface 830 of the apparatus 800 may also include a modem or the like to facilitate communication over a (hardwire or wireless) link, respectively. The interface 830 of the apparatus 800 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 830 of the apparatus 800 is generally configured to communicate with at least one other apparatus, device, node or entity (in particular, the interface thereof).

The memory 820 of the apparatus 800 may represent a (non-transitory/tangible) storage medium and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 820 of the apparatus 800 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 800 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function.

According to exemplifying embodiments of the present invention, the thus illustrated apparatus 800 may represent or realize/embody a (part of a) network element of a cellular radio access network. Specifically, the thus illustrated apparatus 800 may be a (part of a) a UE or gNB in a 5G/NR radio access network in accordance with 3GPP specifications.

More specifically, the thus illustrated apparatus 800 may represent a MAC layer or a MAC entity of such UE or gNB. Hence, the thus illustrated apparatus 800 may be configured to perform a procedure and/or exhibit a functionality and/or implement a mechanism, as described in any one of FIGS. 1 to 7.

Accordingly, the apparatus 800 may be caused or the apparatus 800 or its at least one processor 810 (possibly together with computer program code stored in its at least one memory 820), in its most basic form, may be configured to perform a beam failure detection procedure on the basis of beam failure instance indications from a lower layer using a beam failure detection timer, and to control application of the beam failure detection timer in the beam failure detection procedure in view of indication intervals which are applicable for the beam failure instance indications from the lower layer in the beam failure detection procedure.

As mentioned above, an apparatus according to exemplifying embodiments of the present invention may be structured by comprising respective units or means for performing corresponding operations, procedures and/or functions. For example, such units or means may be implemented/realized on the basis of an apparatus structure, as exemplified in FIG. 8, i.e. by one or more processors 810, one or more memories 820, one or more interfaces 830, or any combination thereof.

FIG. 9 shows a schematic diagram illustrating another example of a functional structure of an apparatus according to exemplifying embodiments of the present invention.

As shown in FIG. 9, an apparatus 900 according to exemplifying embodiments of the present invention may represent a (part of a) network element of a cellular radio access network, such as a UE or gNB in a 5G/NR radio access network in accordance with 3GPP specifications, or a MAC layer or a MAC entity of such UE or gNB. Such apparatus may comprise (at least) a unit or means for performing a beam failure detection procedure on the basis of beam failure instance indications from a lower layer using a beam failure detection timer (denoted as beam failure detection procedure performing unit/means 910), and a unit or means for controlling application of the beam failure detection timer in the beam failure detection procedure in view of indication intervals which are applicable for the beam failure instance indications from the lower layer in the beam failure detection procedure (denoted as beam failure detection timer application controlling unit/means 920).

As evident from the above, the apparatus 900, i.e. the beam failure detection procedure performing unit/means 910 and/or the beam failure detection timer application controlling unit/means 920 may optionally exhibit/realize various functionalities.

As an example, for exhibiting/realizing such functionalities, the beam failure detection procedure performing unit/means 910 may comprise (at least) a unit or means for starting the beam failure detection timer when a beam failure instance indication from a lower layer is obtained (denoted as beam failure detection timer starting unit/means 911), a unit or means for executing beam failure detection, wherein a beam failure instance counter is incremented whenever a beam failure instance indication from the lower layer is obtained and beam failure is detected when the beam failure instance counter reaches a beam failure instance threshold before expiry of the beam failure detection timer (denoted as beam failure detection executing unit/means 912), and a unit or means for resetting the beam failure instance counter upon expiry of the beam failure detection timer (denoted as beam failure instance counter resetting unit/means 913).

As an example, for exhibiting/realizing such functionalities, the beam failure detection timer application controlling unit/means 920 may comprise (at least) a unit or means for controlling application of the beam failure detection timer in the beam failure detection procedure based on a configuration of usability of discontinuous-reception, e.g. a unit or means for specifying a timer value of the beam failure detection timer by using a calculation formula out of a number of predefined calculation formulae, which yields a particular indication interval for the beam failure instance indications from the lower layer among all of the predefined calculation formulae (denoted as timer value specifying unit/means 921), a unit or means for controlling application of the beam failure detection timer in the beam failure detection procedure based on a change of the current indication interval for the beam failure instance indications from the lower layer, e.g. a unit or means for updating a timer value of the beam failure detection timer based on the current indication interval for the beam failure instance indications from the lower layer when the current indication interval changes (denoted as timer value updating unit/means 922), a unit or means for controlling application of the beam failure detection timer in the beam failure detection procedure based on a change of a discontinuous-reception usage state, e.g. a unit or means for updating a timer value of the beam failure detection timer based on the current indication interval for the beam failure instance indications from the lower layer when the discontinuous-reception usage state changes or a unit or means for updating a timer value of the beam failure detection timer based on the current indication interval for the beam failure instance indications from the lower layer in the discontinuous-reception not-in-use state (denoted as timer value updating unit/means 922) or a unit or means for stopping the beam failure detection timer when the discontinuous-reception usage state enters into a discontinuous-reception in-use state and starting the beam failure detection timer when the discontinuous-reception usage state enters into a discontinuous-reception not-in-use state (denoted as beam failure detection timer starting/stopping unit/means 923), and a unit or means for disabling or disregarding application of the beam failure detection timer in the beam failure detection procedure when discontinuous-reception is in use (denoted as beam failure detection timer disabling/disregarding unit/means 924).

For further details regarding the operability/functionality of the individual apparatuses (or units/means thereof) according to exemplifying embodiments of the present invention, reference is made to the above description in connection with any one of FIGS. 1 to 7, respectively.

According to exemplifying embodiments of the present invention, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of any depicted or described apparatuses and other network elements or functional entities, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing enabling/realizing beam failure detection with different indication intervals, e.g. beam failure detection in a higher layer such as a MAC entity of a user equipment element or base station element. Such measures exemplarily comprise that a beam failure detection procedure is performed on the basis of beam failure instance indications from a lower layer using a beam failure detection timer, and application of the beam failure detection timer in the beam failure detection procedure is controlled in view of indication intervals which are applicable for the beam failure instance indications from the lower layer in the beam failure detection procedure.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

List of Acronyms and Abbreviations

3GPP 3rd Generation Partnership Project
BFD Beam Failure Detection
BFI Beam Failure Instance
BLER Block Error Rate
BWP Bandwidth Part
CORESET Control Resource Set
CSI-RS Channel State Information Reference Signal
DL Downlink
DMRS Demodulation Reference Signal
DRX Discontinuous Reception
gNB next Generation Node B (i.e. 5G/NR base station)
L1 Layer 1/Radio Layer
MAC Medium Access Control
NR New Radio
PBCH Physical Broadcast Channel
PHY Physical Layer
PDCCH Physical Downlink Control Channel
PSS Primary Synchronization Signal
RLF Radio Link Failure
RLM Radio Link Monitoring
RRC Radio Resource Control
RS Reference Signal
SS Synchronization Signal
SSB Synchronization Signal Block
SSS Secondary Synchronization Signal
TCI Transmission Configuration Indicator
UE User Equipment
UL Uplink

The invention claimed is:

1. A method comprising:
performing a beam failure detection procedure on the basis of beam failure instance indications from a lower layer using a beam failure detection timer, and
controlling application of the beam failure detection timer in the beam failure detection procedure in view of indication intervals which are applicable for the beam failure instance indications from the lower layer in the beam failure detection procedure, wherein:
the beam failure detection timer cannot be considered expired before occurrence of a next possible beam failure instance indication according to a current indication interval.

2. The method according to claim 1, wherein the beam failure detection procedure comprises:
starting the beam failure detection timer when a beam failure instance indication from a lower layer is obtained,
executing beam failure detection, wherein a beam failure instance counter is incremented whenever a beam failure instance indication from the lower layer is obtained and beam failure is detected when the beam failure instance counter reaches a beam failure instance threshold before expiry of the beam failure detection timer, and
resetting the beam failure instance counter upon expiry of the beam failure detection timer.

3. The method according to claim 2, wherein
application of the beam failure detection timer in the beam failure detection procedure is controlled based on a configuration of usability of discontinuous-reception.

4. The method according to claim 3, wherein controlling application of the beam failure detection timer in the beam failure detection procedure comprises:
specifying a timer value of the beam failure detection timer by using a calculation formula out of a number of predefined calculation formulae, which yields a particular indication interval for the beam failure instance indications from the lower layer among all of the predefined calculation formulae.

5. The method according to claim 2, wherein
the application of the beam failure detection timer in the beam failure detection procedure is controlled based on a change of the current indication interval for the beam failure instance indications from the lower layer.

6. The method according to claim 5, wherein controlling application of the beam failure detection timer in the beam failure detection procedure comprises
updating a timer value of the beam failure detection timer based on the current indication interval for the beam failure instance indications from the lower layer when the current indication interval changes.

7. The method according to claim 1, wherein
the performing and controlling is implemented on a medium access control layer and/or by a medium access control entity, and/or
the lower layer is a physical layer or radio layer, and/or
any beam failure instance indication is provided by a physical layer or radio layer entity, and/or
the method is operable at or by a user equipment element or a base station element.

8. The method according to claim 1, wherein the beam failure detection procedure is performed using the beam failure detection timer with a specified timer value,
the beam failure detection timer is not considered expired before occurrence of a next possible beam failure instance indication according to a current indication interval, if the current indication interval for the beam failure instance indications from the lower layer changes while the beam failure detection timer is running, or if the current indication interval for the beam failure instance indications from the lower layer is larger than the specified timer value of the beam failure detection timer, and
the beam failure detection timer is restarted when a beam failure instance indication is obtained upon occurrence of a next possible beam failure instance indication according to the current indication interval, and/or the beam failure detection timer is considered expired when a beam failure instance indication is not obtained upon occurrence of the next possible beam failure instance indication according to the current indication interval.

9. An apparatus comprising:
at least one processor and at least one memory including a computer program code, wherein the at least one memory and the computer program code are configured, with the at least one processor, to cause the apparatus to perform at least the following:
performing a beam failure detection procedure on the basis of beam failure instance indications from a lower layer using a beam failure detection timer, and
controlling application of the beam failure detection timer in the beam failure detection procedure in view of indication intervals which are applicable for the beam failure instance indications from the lower layer in the beam failure detection procedure, wherein:
the beam failure detection timer cannot be considered expired before occurrence of a next possible beam failure instance indication according to a current indication interval.

10. The apparatus according to claim 9, wherein the beam failure detection procedure comprises
starting the beam failure detection timer when a beam failure instance indication from a lower layer is obtained,
executing beam failure detection, wherein a beam failure instance counter is incremented whenever a beam failure instance indication from the lower layer is obtained and beam failure is detected when the beam failure instance counter reaches a beam failure instance threshold before expiry of the beam failure detection timer, and
resetting the beam failure instance counter upon expiry of the beam failure detection timer.

11. The apparatus according to claim 10, wherein
the apparatus is configured to control application of the beam failure detection timer in the beam failure detection procedure based on a configuration of usability of discontinuous-reception.

12. The apparatus according to claim 11, wherein controlling application of the beam failure detection timer in the beam failure detection procedure comprises
specifying a timer value of the beam failure detection timer by using a calculation formula out of a number of predefined calculation formulae, which yields a particular indication interval for the beam failure instance indications from the lower layer among all of the predefined calculation formulae.

13. The apparatus according to claim 9, wherein
the performing and controlling is implemented on a medium access control layer and/or by a medium access control entity, and/or
the lower layer is a physical layer or radio layer, and/or
any beam failure instance indication is provided by a physical layer or radio layer entity, and/or
the apparatus is operable as or at a user equipment element or a base station element.

14. The apparatus according to claim 9, wherein the computer program product is configured to perform the beam failure detection procedure using the beam failure detection timer with the specified timer value,
the beam failure detection timer is not considered expired before occurrence of a next possible beam failure instance indication according to the current indication interval, if the current indication interval for the beam failure instance indications from the lower layer changes while the beam failure detection timer is running, or if the current indication interval for the beam failure instance indications from the lower layer is larger than the specified timer value of the beam failure detection timer, and
the beam failure detection timer is restarted when a beam failure instance indication is obtained upon occurrence of the next possible beam failure instance indication according to the current indication interval, and/or the beam failure detection timer is considered expired when a beam failure instance indication is not obtained upon occurrence of the next possible beam failure instance indication according to the current indication interval.

15. A non-transitory computer readable medium comprising program instructions that, when executed by an apparatus, cause the apparatus to perform at least the following:
perform a beam failure detection procedure on the basis of beam failure instance indications from a lower layer using a beam failure detection timer, and
control application of the beam failure detection timer in the beam failure detection procedure in view of indication intervals which are applicable for the beam failure instance indications from the lower layer in the beam failure detection procedure, wherein:
the beam failure detection timer cannot be considered expired before occurrence of a next possible beam failure instance indication according to a current indication interval.

16. The non-transitory computer readable medium according to claim 15, wherein the beam failure detection procedure comprises:
starting the beam failure detection timer when a beam failure instance indication from a lower layer is obtained,
executing beam failure detection, wherein a beam failure instance counter is incremented whenever a beam failure instance indication from the lower layer is obtained and beam failure is detected when the beam failure instance counter reaches a beam failure instance threshold before expiry of the beam failure detection timer, and
resetting the beam failure instance counter upon expiry of the beam failure detection timer.

17. The non-transitory computer readable medium according to claim 16, wherein
application of the beam failure detection timer in the beam failure detection procedure is controlled based on a configuration of usability of discontinuous-reception.

18. The non-transitory computer readable medium according to claim 17, wherein
the computer program product is configured to control application of the beam failure detection timer in the beam failure detection procedure based on a configuration of usability of discontinuous-reception.

19. The non-transitory computer readable medium according to claim 18, wherein controlling application of the beam failure detection timer in the beam failure detection procedure comprises:
specifying a timer value of the beam failure detection timer by using a calculation formula out of a number of predefined calculation formulae, which yields a particular indication interval for the beam failure instance indications from the lower layer among all of the predefined calculation formulae.

20. The computer program product according to claim 15, wherein the computer program product is configured to perform the beam failure detection procedure using the beam failure detection timer with the specified timer value,
the beam failure detection timer is not considered expired before occurrence of a next possible beam failure instance indication according to the current indication interval, if the current indication interval for the beam failure instance indications from the lower layer changes while the beam failure detection timer is running, or if the current indication interval for the beam failure instance indications from the lower layer is larger than the specified timer value of the beam failure detection timer, and
the beam failure detection timer is restarted when a beam failure instance indication is obtained upon occurrence of the next possible beam failure instance indication according to the current indication interval, and/or the beam failure detection timer is considered expired when a beam failure instance indication is not obtained upon occurrence of the next possible beam failure instance indication according to the current indication interval.

* * * * *